United States Patent [19]

Okazaki et al.

[11] Patent Number: 5,618,880
[45] Date of Patent: Apr. 8, 1997

[54] SEALING COMPONENT FOR CONNECTOR WATERPROOFING

[75] Inventors: Kiyotaka Okazaki; Masahiro Kanda, both of Shizuoka, Japan

[73] Assignees: Yazaki Corporation; Shin-Etsu Chemical Co., Ltd., both of Tokyo, Japan

[21] Appl. No.: 509,096

[22] Filed: Aug. 1, 1995

[30] Foreign Application Priority Data

Aug. 2, 1994 [JP] Japan .................................. 6-181126

[51] Int. Cl.$^6$ ................................................. C08K 5/24
[52] U.S. Cl. .................... 524/731; 524/789; 524/861; 524/862; 528/15; 528/21; 528/23
[58] Field of Search ................................ 528/15, 21, 23; 524/789, 861, 862, 731

[56] References Cited

U.S. PATENT DOCUMENTS

| | | | |
|---|---|---|---|
| 4,687,870 | 8/1987 | Cavezzan | 528/15 |
| 5,436,308 | 7/1995 | Durfee et al. | 528/15 |

FOREIGN PATENT DOCUMENTS 61-21177  1/1986  Japan .
62-252457  11/1987  Japan .
63-309542  12/1988  Japan .

*Primary Examiner*—Melvyn I. Marquis
*Attorney, Agent, or Firm*—Sughrue, Mion, Zinn, Macpeak & Seas

[57] ABSTRACT

The present invention provides a sealing component for connector waterproofing having an excellent heat resistance, low-temperature resistance and oil resistance which can be economically produced in a reduced molding time. A novel sealing component for connector waterproofing is provided, which comprises a vulcanized composition comprising at least (a) 100 parts by weight of an organopolysiloxane represented by the following average composition formula (I) containing at least two alkenyl groups per molecule and having a viscosity of at least 100,000 cs, (b) from 0.1 to 20 parts by weight of an organohydrogenpolysiloxane represented by the following average composition formula (II) containing at least two hydrogen atoms directly bonded to silicon atom per molecule, (c) from 5 to 500 parts by weight of a finely divided silica filler, (d) the catalytic amount of a platinum catalyst, (e) from 0.005 to 5 parts by weight of a sulfide compound represented by the following general formula (III), and (f) from 0.005 to 5 parts by weight of a triazine compound represented by the following general formula (IV), the formulas (I), (II), (III) and (IV) being as described herein.

9 Claims, 2 Drawing Sheets

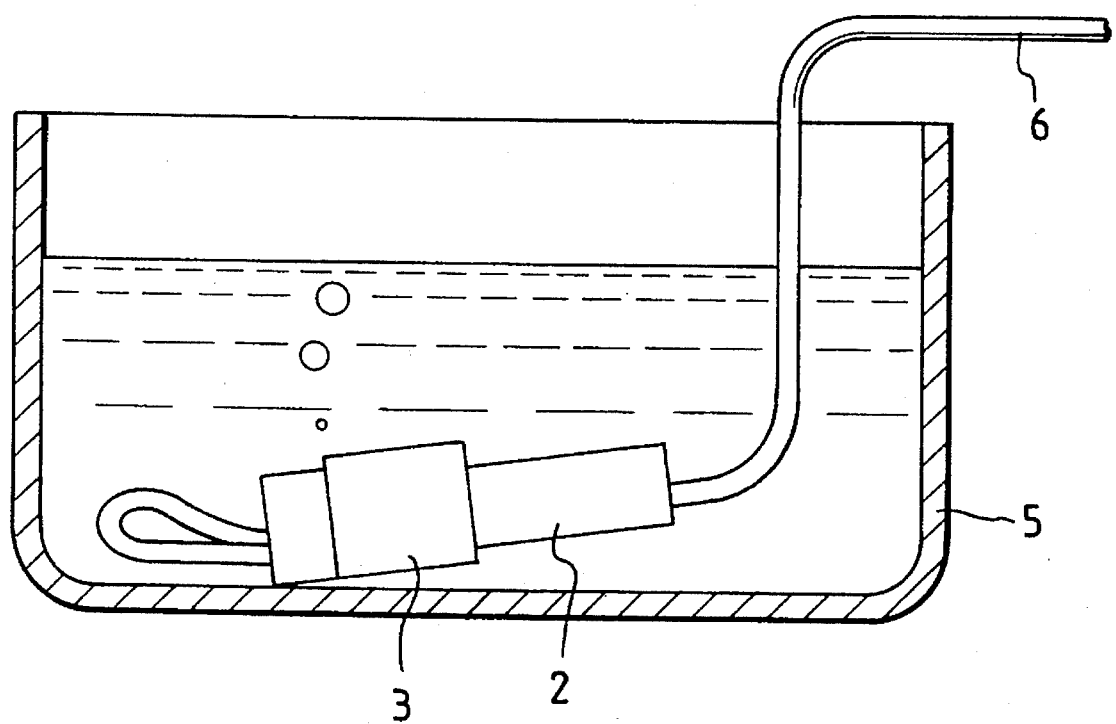

SEALING COMPONENT FOR CONNECTOR WATERPROOFING

FIELD OF THE INVENTION

The present invention relates to a sealing component for connector waterproofing. More particularly, the present invention relates to a sealing component for connector waterproofing which can be easily mounted on a connector housing, can cause connector housings to be fitted into each other with a reduced resistance, can maintain a good waterproofness and can be obtained at a high productivity.

BACKGROUND OF THE INVENTION

Connectors for use in the connection of electrical circuits in automobile need to exhibit a high oil resistance as well as high waterproof sealing properties. Most sealing rubber parts to be mounted on these connectors, such as packing and rubber stopper, are made of oil-bleeding rubber material. In such a use, as molding materials there are used an oil-bleeding NBR obtained by blending a butadiene-acrylonitrile copolymer with an aliphatic hydrocarbon oil (JP-A-61-21177 (The term "JP-A" as used herein means an "unexamined published Japanese patent application")), oil-bleeding silicone rubber obtained by blending a silicone rubber with a silicone oil (JP-A-62-252457), oil-bleeding polyolefin rubber obtained by blending a polyolefinic rubber with an ester plasticizer (JP-A-63-309542), etc.

However, all these rubber materials have defects. For example, NBR materials are disadvantageous in that they are not heat-resistant enough to use in high temperature zones in automobile engine room, though being available at a low price and excellent in oil resistance. Silicone rubber materials are excellent in heat resistance, low-temperature resistance and oil resistance but are expensive and find difficulty in general-purpose properties. Further, polyolefinic materials have an insufficient oil resistance and thus are not suitable for use in automobile engine room.

Under these circumstances, it is impossible to reduce the price of the silicone rubber having relatively excellent properties while maintaining the excellent properties. Therefore, various approaches for reducing the molding time of rubber parts have been proposed to reduce the price of the rubber parts. A general millable silicone rubber composition comprises an organic peroxide as a vulcanizing agent and is thus advantageous in that the blend exhibits a good storage stability and a long pot life, and can be easily handled. On the contrary, this type of silicone rubber composition is disadvantageous in that it requires a prolonged vulcanizing time and thus cannot be molded in a reduced period of time.

On the other hand, a binary liquid silicone rubber composition which undergoes addition reaction for vulcanization in the presence of a platinum catalyst has been developed. The addition reaction type liquid silicone rubber composition requires a drastically reduced vulcanizing time and thus can be molded in a reduced period of time. However, this type of liquid silicone rubber composition is disadvantageous in that the mixture of two liquids must be immediately injected into the mold, requiring an additional molding apparatus and giving troublesome operation.

SUMMARY OF THE INVENTION

It is therefore an object of the present invention to provide a sealing component for connector waterproofing having an excellent heat resistance, low-temperature resistance and oil resistance which can be economically prepared in a reduced molding time by solving the problems with sealing components for connector waterproofing prepared from prior art rubber materials.

The foregoing object of the present invention will become more apparent from the following detailed description and examples.

The foregoing object of the present invention is accomplished with a sealing component for connector waterproofing, which comprises a vulcanized composition comprising at least (a) 100 parts by weight of an organopolysiloxane represented by the following average composition formula (I) containing at least two alkenyl groups per molecule and having a viscosity of at least 100,000 cs, (b) from 0.1 to 20 parts by weight of an organohydrogenpolysiloxane represented by the following average composition formula (II) containing at least two hydrogen atoms directly bonded to silicon atom per molecule, (c) from 5 to 500 parts by weight of a finely divided silica filler, (d) the catalytic amount of a platinum catalyst, (e) from 0.005 to 5 parts by weight of a sulfide compound represented by the following general formula (III), and (f) from 0.005 to 5 parts by weight of a triazine compound represented by the following general formula (IV):

wherein $R^1$ represents a substituted or unsubstituted monovalent hydrocarbon group; and m represents a positive number of from 1.98 to 2.02;

wherein $R^2$ represents a substituted or unsubstituted monovalent hydrocarbon group; p represents a positive number of from 0 to 3; and q represents a positive number of from 0.005 to 1, with the proviso that the sum of p and q is from 0.8 to 3;

wherein $R^3$ and $R^4$ may be the same or different and each represent a monovalent hydrocarbon group; and r represents a positive number of from 1 to 4;

wherein $R^5$, $R^6$ and $R^7$ may be the same or different and each represent a group selected from the group consisting of a peroxy group, a substituted or unsubstituted monovalent hydrocarbon group, a hydroxyl group and a hydrogen atom, with the proviso that at least one of $R^5$, $R^6$ and $R^7$ is a peroxy group.

A sealing component for connector waterproofing comprising an oil-bleeding vulcanized composition further containing a silicon-containing bleed oil (g) in addition to the foregoing components (a) to (f) can exert a stronger effect.

BRIEF DESCRIPTION OF THE DRAWINGS

By way of example and to make the description more clear, reference is made to the accompanying drawings in which:

FIG. 2 illustrates how to examine the sealing properties of the sealing component for connector waterproofing, wherein the reference numeral 1 indicates a rubber packing, the reference numeral 2 indicates a female housing, the reference numeral 3 indicates a male housing, the reference numeral 4 indicates a rubber stopper, the reference numeral 5 indicates a water bath, the reference numeral 6 indicates an air tube, the reference numeral 7 indicates a male metallic terminal, the reference numeral 8 indicates a female metallic terminal, and the reference numeral 9 indicates an electric wire.

DETAILED DESCRIPTION OF THE INVENTION

Figure 1:
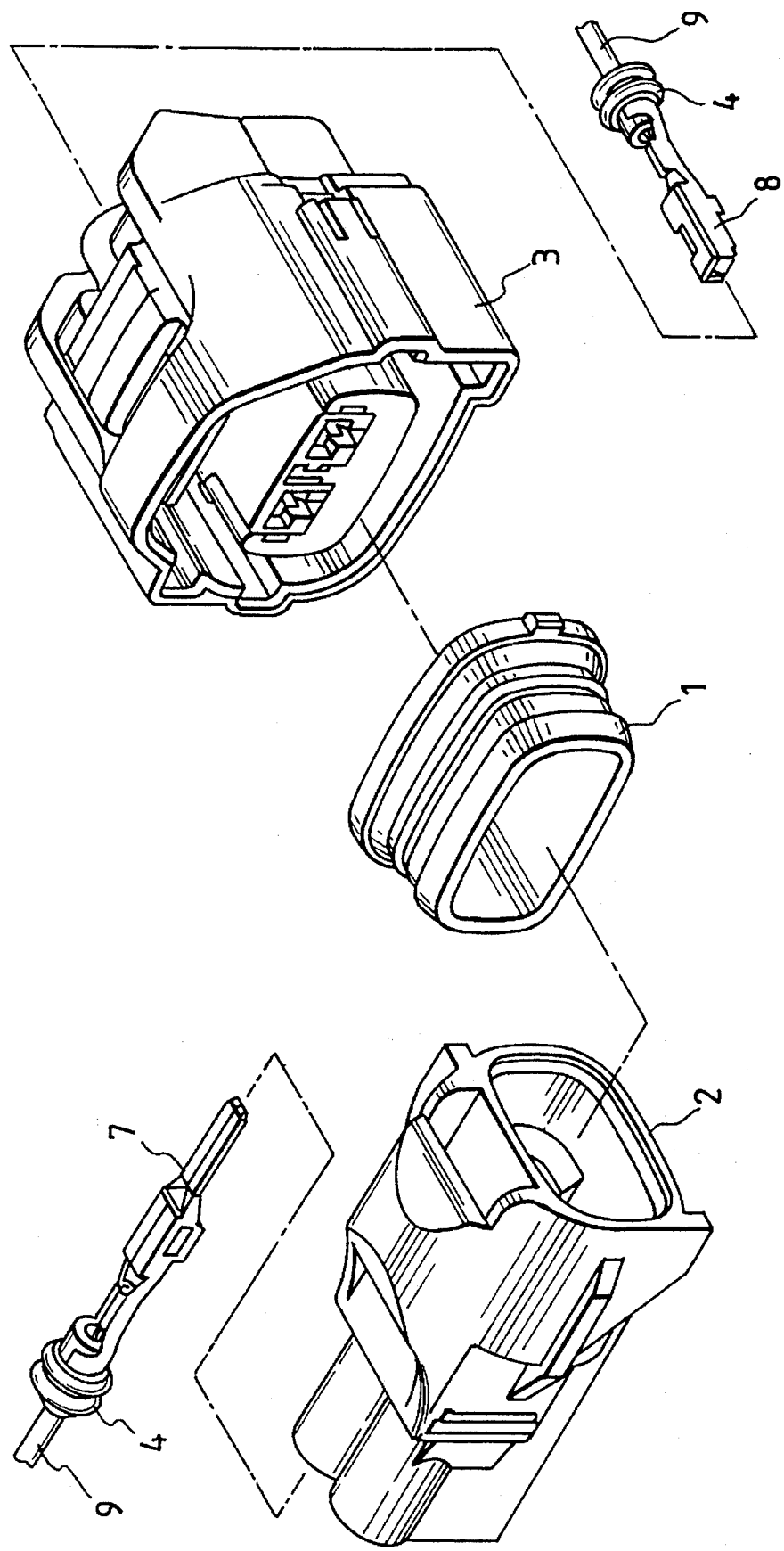
FIG. 1 illustrates how to use an example of the sealing component for connector waterproofing of the present invention.

The organopolysiloxane as the component (a) of the present invention is a straight-chain organopolysiloxane represented by the average composition formula $R^1{}_m SiO_{(4-m)/2}$ (in which m represents a positive number of from 1.98 to 2.02) which is normally referred to as "silicone oil" or "raw silicone rubber" wherein $R^1$ preferably represents an alkyl group such as methyl, ethyl and propyl, a cycloalkyl group such as cyclohexyl, an alkenyl group such as vinyl and allyl, an aryl group such as phenyl and tollyl or a chloromethyl or 3,3,3-trifluoropropyl group obtained by substituting some of hydrogen atoms connected to carbon atoms in these groups with a halogen atom or a cyano group, etc., with the proviso that at least two alkenyl groups are incorporated per molecule and $R^1$ normally comprises at least 50 mol % of methyl group, from 0 to 50 mol % of phenyl group and from 0.01 to 5 mol % of vinyl group. The monovalent hydrocarbon group represented by $R^1$ preferably has 1 to 15 carbon atoms, more preferably 1 to 8 carbon atoms.

The organopolysiloxane is preferably terminated by a triorganosilyl group such as trimethylsilyl group, dimethylvinylsilyl group, methyldivinylsilyl group and methylphenylvinylsilyl group or a hydroxy group. The organopolysiloxane of the present invention preferably exhibits a viscosity of at least 100,000 cs to maintain the desired hardness of the silicone rubber obtained by hardening a composition containing it.

The organohydrogenpolysiloxane containing at least two hydrogen atoms directly bonded to silicon atom per molecule as the component (b) of the present invention is represented by the average composition formula $R^2{}_p SiH_q O_{(4-p-q)/2}$ (in which $R^2$ represents a substituted or unsubstituted monovalent hydrocarbon group, p represents a positive number of from 0 to 3; and q represents a positive number of from 0.005 to 1, with the proviso that the sum of p and q is from 0.8 to 3). The component (b) preferably has a polymerization degree of not more than 300. Examples of such an organohydrogenpolysiloxane include diorganopolysiloxane terminated by dimethylhydrogensilyl group, copolymer of dimethylsiloxane unit with methylhydrogensiloxane unit and terminal trimethylsiloxy unit, low viscosity fluid consisting of dimethylhydrogensiloxane unit ($H(CH_3)_2SiO_{0.5}$ unit) and $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane. The monovalent hydrocarbon group represented by $R^2$ preferably has 1 to 15 carbon atoms, more preferably 1 to 8 carbon atoms.

The added amount of the component (b) as a hardener is preferably from 0.1 to 20 parts by weight based on 100 parts by weight of the organopolysiloxane as the component (a) or such that the proportion of hydrogen atoms directly bonded to silicon atom is from 50 to 500 mol % based on the amount of alkenyl group in the organopolysiloxane as the component (a).

The silica filler to be used as the component (c) in the present invention preferably exhibits a specific surface area of not less than 50 $m^2$/g, more preferably from 100 to 400 $m^2$/g. Examples of such a silica filler include fumed silica, calcined silica, and precipitated silica. These silica fillers may be used singly or in combination. These silica fillers may be treated with a chain organopolysiloxane, cyclic organopolysiloxane or hexamethyldisilazane on the surface thereof.

The added amount of the component (c) is preferably from 5 to 500 parts by weight, more preferably from 10 to 50 parts by weight based on 100 parts by weight of the organopolysiloxane as the component (a). If the added amount of the organopolysiloxane exceeds or falls below the above defined range, the resulting silicone rubber composition exhibits a reduced workability. Further, the hardened matter obtained by hardening such a composition leaves something to be desired in mechanical strength, i.e., tensile strength and tear strength.

As the platinum catalyst to be used as the component (d) in the present invention there may be used a compound known as a catalyst for the addition reaction of organopolysiloxane. Specific examples of such a platinum catalyst include platinum element, platinum compound, platinum complex, chloroplatinic acid, compound of chloroplatinic acid with alcohol, aldehyde, ether, etc., and complex of chloroplatinic acid with various olefins.

The added amount of the component (d) is preferably from 1 to 2,000 ppm based on the weight of the organopolysiloxane as the component (a) as calculated in terms of platinum atom.

The sulfide compound to be used as the component (e) in the present invention serves as an addition reaction controller which inhibits premature gelation at room temperature to stabilize the composition without reducing the vulcanizing speed particularly during molding. The sulfide compound is represented by the general formula $R^3$-$S_r$-$R^4$ wherein $R^3$ and $R^4$ may be the same or different and each represent a substituted or unsubstituted monovalent hydrocarbon group having not less than 3 carbon atoms, preferably from 7 to 50 carbon atoms, and r represents a positive number of from 1 to 4, preferably from 1 or 2.

Examples of such a compound to be used as the component (e) include $S(-C_{12}H_{23})_2$, $S(-C_{10}H_{19})_2$, $S(-CH_2Ph)_2$, $H_{11}C_5$-S-$C_{12}H_{23}$, Ph-$C_2H_4$-S-S-$C_{10}H_{21}$, $S(-C_5H_{10}COOC_{21}H_{43})_2$, $S(-CH_2COOC_{10}H_{21})_2$, $H_{21}C_{10}$-S-$C_4H_8COOC_{10}H_{21}$, and $PhOCOH_6C_3$-S-$C_{10}H_{21}$. The added amount of the component (e) is from 0.005 to 5 parts by weight, preferably from 0.01 to 1 part by weight based on 100 parts by weight of the organopolysiloxane as the component (a).

The triazine compound to be used as the component (f) in the present invention serves as an addition reaction controller which inhibits vulcanization scorching particularly during molding. The triazine compound is represented by the following general formula (IV):

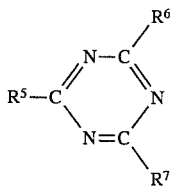

(IV)

wherein $R^5$, $R^6$ and $R^7$ may be the same or different and each represent a group selected from the group consisting of a peroxy group, a substituted or unsubstituted monovalent hydrocarbon group, a hydroxyl group and a hydrogen atom, with the proviso that at least one of $R^5$, $R^6$ and $R^7$ is a peroxy group. The monovalent hydrocarbon group represented by $R^5$, $R^6$ or $R^7$ preferably has 1 to 15 carbon atoms, more preferably 1 to 8 carbon atoms. The peroxy group is represented by the general formula -OOR wherein R represents a hydrogen atom, a $C_{1-30}$, particularly $C_{1-10}$ substituted or unsubstituted monovalent hydrocarbon group or a $C_{1-30}$, particularly $C_{1-10}$ substituted or unsubstituted monovalent hydrocarbon group containing a carbonyl group. Specific examples of the peroxy group include $-OOC(CH_3)_3$, $-OOCOPh$, $-OOCOCH(CH_3)_2$, $-OOCOCH_3$, and $-OOPh(CH_3)_2$.

Specific examples of the triazine compound (f) containing such a peroxy group include the following compounds:

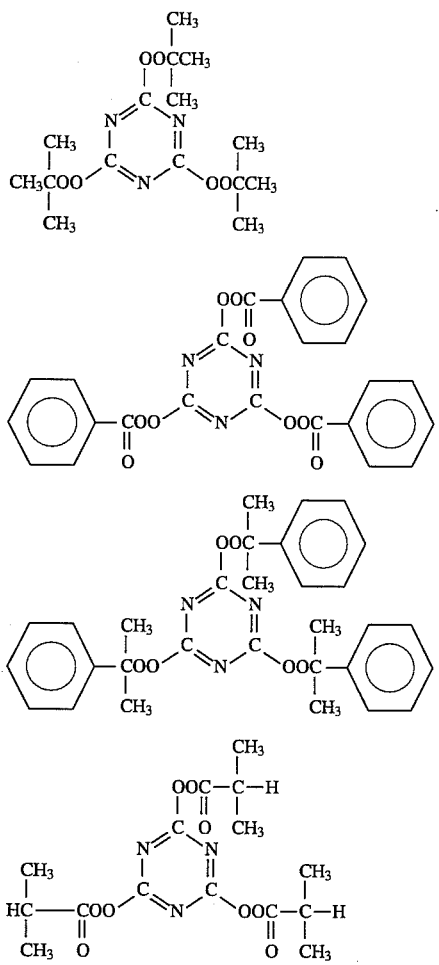

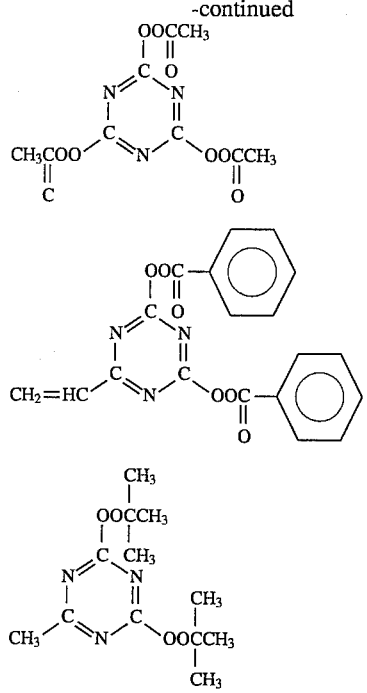

The added amount of the component (f) is from 0.005 to 5 parts by weight, preferably from 0.005 to 1 part by weight based on 100 parts by weight of the organopolysiloxane as the component (a). In addition to the components (e) and (f), a known controller such as 1,3-divinyl-1,1,3,3-tetramethyl-disiloxane and 1,3,5,7-tetramethyl-1,3,5,7-tetravinylcy-clotetrasiloxane may be optionally blended so far as the effect of the present invention is not impaired.

As the bleed oil which can be used as the component (g) in the present invention there may be used an oil containing one or more silicon atoms commonly incorporated in oil-bleeding silicone rubbers as it is. Such a bleed oil preferably exhibits a viscosity of from 50 to 20,000 cp at 25° C. and contains 3 or more silicon atoms accompanying siloxane bond. The organic groups connected to the silicon atom in the silicon-containing bleed oil preferably comprise an aryl group such as phenyl group and tollyl group or a group represented by $R^6$-(-O-$R^9$-)$_s$- (in which $R^6$ represents a hydrogen atom or a $C_{1-8}$ monovalent hydrocarbon group, $R^9$ represents a $C_{2-8}$ divalent hydrocarbon group, and s represents an integer of from 1 to 10) in a proportion of from 1 to 50 more preferably a phenyl group in a proportion of from 10 to 50%.

The added amount of the component (g) is preferably from 1 to 30 parts by weight based on 100 parts by weight of the organopolysiloxane as the component (a). If the added amount of the component (g) falls below 1 part by weight, the desired oil bleeding cannot be possibly obtained. On the contrary, if the added amount of the component (g) exceeds 30 parts by weight, the resulting rubber exhibits a reduced mechanical strength or it is made difficult to maintain the desired rubber hardness. Further, the oil can bleed out on the surface of the unvulcanized rubber composition, causing malfusion in the molded product or vigorous stain on the mold during vulcanization and molding.

Further, a known compound which can be incorporated in silicone rubbers may be incorporated in the composition of the present invention in a proper amount. Examples of such a known compound employable in the present invention include fillers such as ground silica, diatomaceous earth, iron oxide, zinc oxide, titanium oxide, barium oxide, magnesium oxide, cerium hydroxide, calcium carbonate, magnesium carbonate, zinc carbonate, carbon black, asbestos, glass wool, finely divided mica and molten finely divided silica. In addition, pigments, dyes, age inhibitors, oxidation inhibitors, antistatic agents, fire retardants such as antimony oxide and paraffin chloride, thermal conductivity improvers such as boron nitride and aluminum oxide, etc. may be used.

The sealing component for connector waterproofing of the present invention can be obtained by a process which comprises mixing the foregoing components, kneading the mixture, injecting the mixture into a mold, and then heating the mixture so that it is vulcanized and molded. The kneading of the mixture can be effected by means of a known rubber composition kneader such as roll mill, kneader and Banbury mixer. The vulcanization and molding of the mixture can be effected by means of a known rubber vulcanizing and molding machine such as injection molding machine and transfer molding machine.

Since the sealing component for connector waterproofing of the present invention comprises a composition containing a sulfide compound as the component (e) and a triazine compound as the component (f) as mentioned above, it exhibits an excellent storage stability until molding and thus can be vulcanized and molded in a drastically reduced period of time. A silicone bleed oil having a poor compatibility with the base rubber, if used, can gradually bleed out after vulcanization and molding to enhance the sealing properties of the rubber with respect to the connector housing.

The present invention will be further described in the following example, but the present invention should not be construed as being limited thereto.

EXAMPLE 1

Materials set forth in Table 1 were kneaded by means of a kneader mixer and a two-roll mill. In some detail, the materials A to D were first mixed to obtain a base compound. To the base compound were then added sequentially the materials E, F, G, H and I to obtain rubber compositions 1 to 12 having formulations set forth in Table 2.

Table 1

Material A (component a): methyl vinyl polysiloxane having an average polymerization degree of 3,000 consisting of 99.825 mol % of $(CH_3)_2SiO$ unit, 0.15 mol % of $(CH_3)(CH_2=CH)SiO$ unit and 0.025 mol % of $(CH_2=CH)(CH_3)_2SiO$ unit Material B (component c): fumed silica having a specific surface area of 200 m$^2$/g (Aerosil 200, available from Nihon Aerosil Co., Ltd.)

Material C: diphenylsilanediol

Material D (component g): phenyl-containing diorganopolysiloxane represented by the average molecular formula $(CH_3)_3SiO[SiPh_2O]_4[Si(CH_3)_2O]_{12}Si(CH_3)_3$ Material E (component d): solution of chloroplatinic acid in alcohol substituted by low polymerization degree dimethyl vinyl polysiloxane (vinyl content: 0.7 mol %)(platinum atom: 1% by weight)

Material F (component f): 2,4,6-tris-(t-butylperoxy)-1,3,5-triazine

Material G (component e): di-n-hexylsulfide

Material H (component b): organohydrogen polysiloxane having Si-H content of 0.005 mol/g and a polymerization degree of 100

Material I: 2,5-dimethyl-2,5-di(t-butylperoxy)hexane

These rubber compositions were then allowed to stand at a temperature of 30° C. for 5 days and for 30 days. These rubber compositions were each then measured for the time required until vulcanization begins at a temperature of 170° C. ($T_{10}$: time required until the torque reaches 10% of the final torque) by means of an oscillating disc rheometer available from Toyo Seiki Kogyo K.K. After examined for storage stability, these rubber compositions were each subjected to transfer molding at a mold temperature of 170° C. for a vulcanizing time of 2 minutes or an optimum vulcanizing time to form a rubber packing 1 having a shape shown in FIG. 1 which was then examined for moldability and percent occurrence of malmolding. For the evaluation of moldability, G (good) indicates a good moldability and P (poor) indicates the occurrence of an insufficient packing in Table 2.

These rubber packings thus obtained were each mounted on a female housing 2 for resin waterproofing connector with a rubber stopper 4 having a shape shown in FIG. 1 which had been previously molded from a different material, and then fitted into a male housing 3. The force (kgf) required to fit these components was measured by means of a compression stress meter (Autograph, available from Shimadzu Corp.).

An air tube 6 was attached to a portion of the waterproofing connector housing on which the rubber stopper had been mounted. As shown in FIG. 2, the test sample was then immersed in a water bath 5 to a depth of about 10 cm. Air was then pumped into the connector housing through the air tube 6 until the pressure therein reached 9.8 kPa. The test sample was then examined for air leak over 30 seconds. If no air leak was observed, air was further pumped into the connector housing to raise the pressure by 9.8 kPa, and the pressure thus raised was then kept over 30 seconds to examine air leak. This procedure was repeated until the pressure reached 59 kPa. For the evaluation of initial waterproofness, G (good) indicates no air leak and P (poor) indicates the occurrence of air leak in Table 2.

On the other hand, the waterproofing connector housing thus assembled was aged at a temperature of 120° C. for 1,000 hours. For the evaluation of waterproofness with time, the test sample was examined in the same manner as above.

The results of these evaluation tests are set forth in Table 2.

TABLE 2

| | Properties of rubber composition and packing | | | | | | | | | | |
|---|---|---|---|---|---|---|---|---|---|---|---|
| Sample No. | 1 | 2 | 3 | 4 | 5* | 6* | 7* | 8* | 9* | 10* | 11* |
| Material | | | | | | | | | | | |
| A: component a | 100 | 100 | 100 | 100 | 100 | 100 | 100 | 100 | 100 | 100 | 100 |
| B: component c | 30 | 30 | 30 | 30 | 30 | 30 | 30 | 30 | 30 | 30 | 30 |
| C | 4 | 4 | 4 | 4 | 4 | 4 | 4 | 4 | 4 | 4 | 4 |
| D: component g | — | — | — | 6 | — | — | — | — | — | — | — |

TABLE 2-continued

| | Properties of rubber composition and packing | | | | | | | | | | |
|---|---|---|---|---|---|---|---|---|---|---|---|
| Sample No. | 1 | 2 | 3 | 4 | 5* | 6* | 7* | 8* | 9* | 10* | 11* |
| E: component d | 0.7 | 0.7 | 0.7 | 0.7 | — | 0.7 | 0.7 | 0.7 | 0.7 | 0.7 | 0.7 |
| F: component f | 0.008 | 0.008 | 0.016 | 0.008 | — | 0.008 | 0.008 | 0.016 | 0.016 | — | 7.5 |
| G: component e | 0.014 | 0.075 | 0.075 | 0.014 | — | 0.014 | 0.014 | — | 7.5 | 0.075 | 0.014 |
| H: component b | 1.7 | 1.7 | 1.7 | 1.7 | — | — | 30 | 1.7 | 1.7 | 1.7 | 1.7 |
| I | — | — | — | — | 0.5 | — | — | — | — | — | — |
| Results of evaluation of properties | | | | | | | | | | | |
| After 5 day ageing | | | | | | | | | | | |
| $T_{10}$ (sec) | 43 | 40 | 43 | 46 | 111 | —*1 | 48 | 39 | 92 | 12 | 101 |
| Moldability | E | E | E | E | E | — | P | E | E | P | E |
| % Defective | 0.50 | 0.75 | 0.50 | 0.75 | 0.25 | — | 7.00 | 1.00 | 0.75 | 36.75 | 0.75 |
| Vulcanizing time (min.) | 2 | 2 | 2 | 2 | 7 | — | 2 | 2 | 5 | 2 | 7 |
| Fitting force (kgf) | 2.12 | 2.15 | 2.13 | 1.88 | 2.40 | —*2 | 1.80 | 2.44 | 2.31 | 2.12 | 2.30 |
| Initial waterproofness | E | E | E | E | E | —*2 | P | E | E | P | P |
| Waterproofness with time | E | E | E | E | E | —*2 | P | E | E | P | P |
| After 30 day ageing | | | | | | | | | | | |
| $T_{10}$ (sec) | 44 | 42 | 43 | 46 | 115 | —*1 | 47 | —*2 | 96 | 13 | 108 |
| Moldability | E | E | E | E | E | — | P | —*3 | E | P | P |
| % Defective | 0.75 | 1.00 | 0.50 | 0.50 | 0.25 | — | 8.50 | —*3 | 1.00 | 27.5 | 0.75 |
| Vulcanizing time (min.) | 2 | 2 | 2 | 2 | 2 | — | 2 | —*2 | 5 | 2 | 2 |
| Fitting force (kgf) | 2.20 | 2.09 | 2.17 | 1.96 | 2.29 | —*2 | 1.71 | — | 2.21 | 2.04 | 2.34 |
| Initial waterproofness | E | E | E | E | E | —*2 | P | — | E | P | P |
| Waterproofness with time | E | E | E | E | E | —*2 | P | — | E | P | P |

*comparative example
*1non-vulcanizable
*2immeasurable
*3non-moldable

The results set forth in Table 2 show that all the sealing components for connector waterproofing molded from the rubber compositions 1 to 4 (rubber composition 4 further comprises a bleed oil) require a reduced vulcanizing time and exhibit excellent properties. On the other hand, the rubber composition 5 vulcanized with an organic peroxide requires a prolonged vulcanizing time. The comparative sealing component for connector waterproofing molded from the rubber composition 5 requires a greater force to fit connector housings. All the rubber compositions 6 to 11, which don't comprise the vulcanization controller of the present invention in a proper amount, exhibit a poor moldability, a high percent defective and a poor waterproofness.

As mentioned above, the sealing component for connector waterproofing of the present invention comprises a rubber composition having a special formulation which exhibits an excellent storage stability and requires a short vulcanizing time and thus is insusceptible to quality variation due to malmolding and exhibits excellent waterproofness, surface wettability and water repellency. Further, the sealing component for connector waterproofing can be produced at a reduced manufacturing cost.

While the invention has been described in detail and with reference to specific embodiments thereof, it will be apparent to one skilled in the art that various changes and modifications can be made therein without departing from the spirit and scope thereof.

What is claimed is:

1. A sealing component for connector waterproofing, which comprises a vulcanized composition comprising at least (a) 100 parts by weight of an organopolysiloxane represented by the following average composition formula (I) containing at least two alkenyl groups per molecule and having a viscosity of at least 100,000 cs, (b) from 0.1 to 20 parts by weight of an organohydrogenpolysiloxane represented by the following average composition formula (II) containing at least two hydrogen atoms directly bonded to a silicon atom per molecule, (c) from 5 to 500 parts by weight of a finely divided silica filler, (d) a catalytic amount of a platinum catalyst, (e) from 0.005 to 5 parts by weight of a sulfide compound represented by the following general formula (III), and (f) from 0.005 to 5 parts by weight of a triazine compound represented by the following general formula (IV):

$$R^1{}_m SiO_{(4-m)/2} \qquad (I)$$

wherein $R^1$ represents a substituted or unsubstituted monovalent hydrocarbon group; and m represents a positive number of from 1.98 to 2.02;

$$R^2{}_p SiH_q O_{(4-p-q)/2} \qquad (II)$$

wherein $R^2$ represents a substituted or unsubstituted monovalent hydrocarbon group; p represents a positive number of from 0 to 3; and q represents a positive number of from 0.005 to 1, with the proviso that the sum of p and q is from 0.8 to 3;

$$R^3\text{-}Sr\text{-}R^4 \qquad (III)$$

wherein $R^3$ and $R^4$ may be the same or different and each represent a substituted or unsubstituted monovalent hydrocarbon group having 3 or more carbon atoms; and r represents a positive number of from 1 to 4;

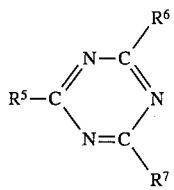

wherein $R^5$, $R^6$ and $R^7$ may be the same or different and each represents a group selected from the group consisting of a peroxy group, a substituted or unsubstituted monovalent hydrocarbon group, a hydroxyl group and a hydrogen atom, with the proviso that at least one of $R^5$, $R^6$ and $R^7$ is a peroxy group.

2. The sealing component for connector waterproofing according to claim 1, wherein said vulcanized composition further comprises a silicon-containing bleed oil (g).

3. The sealing component for connector waterproofing according to claim 1, wherein the organohydrogenpolysiloxane as component (b) has a polymerization degree of 300 or less.

4. The sealing component for connector waterproofing according to claim 1, wherein the silica filler as component (c) is selected from the group consisting of fumed silica, calcined silica, and precipitated silica.

5. The sealing component for connector waterproofing according to claim 1, wherein the platinum catalyst as component (d) is selected from the group consisting of elemental platinum, a platinum compound, a platinum complex, chloroplatinic acid, a compound of chloroplatinic acid with a member selected from the group consisting of an alcohol, an aldehyde, and an ether, and a complex of chloroplatinic acid with an olefins.

6. The sealing component for connector waterproofing according to claim 1, wherein the amount of component (d) is from 1 to 2,000 ppm based on the weight of the organopolysiloxane as component (a) calculated in terms of platinum atom.

7. The sealing component for connector waterproofing according to claim 1, wherein the sulfide compound as component (e) is selected from the group consisting of $S(-C_{12}H_{23})_2$, $S(-C_{10}H_{19})_2$, $S(-CH_2Ph)_2$, $H_{11}C_5\text{-}S\text{-}C_{12}H_{23}$, $Ph\text{-}C_2H_4\text{-}S\text{-}S\text{-}C_{10}H_{21}$, $S(-C_5H_{10}COOC_{21}H_{43})_2$, $S(-CH_2COOC_{10}H_{21})_2$, $H_{21}C_{10}\text{-}S\text{-}C_4H_8COOC_{10}H_{21}$, and $PhOCOH_6C_3\text{-}S\text{-}C_{10}H_{21}$ where Ph represents a phenyl group.

8. The sealing component for connector waterproofing according to claim 1, wherein the triazine compound as component (f) is selected from the following compounds:

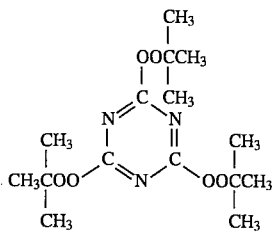

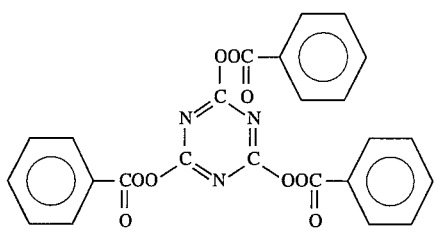

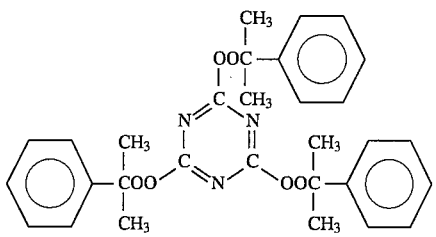

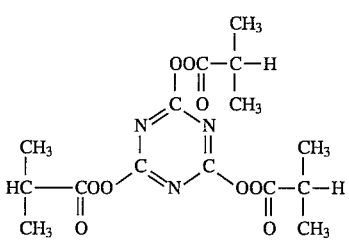

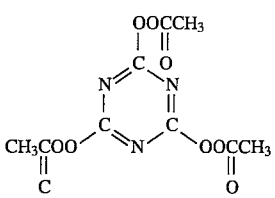

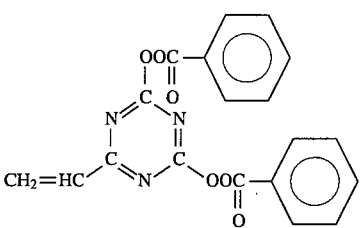

or

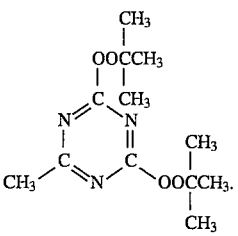

9. The sealing component for connector waterproofing according to claim 2, wherein the bleed oil as component (g) has a viscosity of from 50 to 20,000 cp at 25° C. and contains 3 or more silicon-atoms accompanying a siloxane bond.

* * * * *